United States Patent [19]

Gorin et al.

[11] Patent Number: 4,910,669

[45] Date of Patent: Mar. 20, 1990

[54] BINARY TREE MULTIPROCESSOR

[75] Inventors: Allen L. Gorin, Fairlawn; Robert N. Lewine, Hanover Township, Morris County; Patrick A. Makofsky, Randolph; Richard R. Shively, Convent Station, all of N.J.

[73] Assignee: AT&T Bell Laboratories, Murray Hill, N.J.

[21] Appl. No.: 34,824

[22] Filed: Apr. 3, 1987

[51] Int. Cl.[4] .................... G06F 15/16; G06F 13/00
[52] U.S. Cl. .................... 364/200; 364/229.41; 364/231.8; 364/271.6
[58] Field of Search ... 364/900 MS File, 200 MS File, 364/300

[56] References Cited

U.S. PATENT DOCUMENTS

| | | | |
|---|---|---|---|
| 4,384,273 | 5/1983 | Ackland et al. | 364/900 |
| 4,400,788 | 8/1983 | Myers . | |
| 4,507,726 | 3/1985 | Grinberg et al. | 364/200 |
| 4,583,164 | 4/1986 | Tolle | 364/200 |
| 4,591,980 | 5/1986 | Huberman et al. | 364/200 |
| 4,599,691 | 7/1986 | Sakaki et al. | 364/900 |
| 4,599,693 | 7/1986 | Denenberg | 364/900 |
| 4,622,632 | 11/1986 | Tanimoto et al. | 364/200 |
| 4,639,857 | 1/1987 | McCanny et al. | 364/200 |
| 4,748,674 | 5/1988 | Freeman | 382/14 |
| 4,794,528 | 12/1988 | Hirose et al. | 364/300 |

OTHER PUBLICATIONS

"The Tree Machine: A Highly Concurrent Computing Environment", by S. A. Browning, Technical Report, Jan. 1980, Computer Science California Institute of Technology, Pasadena, California 91125, spons Defense Advanced Research Projects Agency.
Strategic Computing, New-Generation Computing Technology: A Strategic Plan for its Development and Application to Critical Problems in Defense, Defense Advanced Research Projects Agency, Oct. 28, 1983.
DADO: A Parallel Processor for Expert Systems, by S. J. Stolfo et al, "Proceedings of the 1984 International Conference on Parallel Processing" pp. 74–82, Department of Computer Science Columbia University, New York City, N.Y. 10027, by S. J. Stolfo.
"Continuous Speech Recognition on a Butterfly® Parallel Processor", Proceedings of the 1986 International Conference on Parallel Processing, Aug. 19–22, 1986 by L. Cosell.
"Speech Recognition on the DADO/DSP Multiprocessor", A. L. Gorin et al, ICASSP 1986 Proceedings, Sponsored by the IEEE Acoustics, Speech, and Signal Processing Society, The Institute of Electronics and Communication Engineers of Japan and the Acoustical Society of Japan, vol. 1 of 4.
Sunday Star-Ledger, Article, "Princeton 'Braintrust'-Top Scientists Plug into Supercomputer" by K. MacPherson.

Primary Examiner—Eddie P. Chan
Attorney, Agent, or Firm—Charles E. Graves

[57] ABSTRACT

A binary tree multiprocessing array of plural signal processing elements, and having input/output for the array entirely through a root one of the processing elements, includes in each processing element thereof a hardware, pipelined, floating point, multiply/accumulate processing function for cooperating with a procesing element memory and a processing element input/output processing function to perform signal pattern matching of input digital signal sequences provided to and/or through the root processing element with respect to at least one digital signal sequence pattern stored in the memory.

2 Claims, 9 Drawing Sheets

BINARY TREE MULTIPROCESSOR

FIELD OF THE INVENTION

This invention relates to a binary tree multiprocessor, and it relates more particularly to such a multiprocessor which has essentially like processing elements at the respective nodes and has all data signal input/output with respect to a host processor through the root node, i.e. the node of the single-node row of the array through which input signal communication expansion takes place to other larger rows of the array.

BACKGROUND OF THE INVENTION

The term "digital signal pattern" matching is here used in reference to the process of matching the digital encoding of an envelope pattern of an input signal time sequence against the envelope pattern of a reference signal time sequence. Such matching is involved in, for example, robotic control of a factory operation in which an object may be placed on a conveyor belt in an unpredictable location and orientation; and a robotic manipulator must be able to identify that location and orientation and manipulate the object appropriately. Another well known signal pattern matching application is in speech recognition systems in which a speech signal envelope representing a word or a syllable is compared against thousands of reference signal envelopes representing all of the possibilities of interest.

One way to perform such signal pattern matching is to correlate mathematically a perceived signal envelope pattern with the patterns of each of the reference possibilities and select the reference pattern with the maximum correlation with the input signal. Another example of such pattern matching is the dynamic time warp match of the continuous speech pattern recognizer in the C. S. Meyers et al. U.S. Pat. No. 4,400,788.

Signal pattern matching is to be distinguished from data, or value, pattern matching in which values of each of successive data segments of a sequence of input segments is compared, usually subtractively, against similar reference segments to identify all locations in the database of each input segment. Data pattern matching is often applied in information retrieval systems. One example of such data pattern matching occurs in rule-based systems, where values in "if" clauses of rules are matched against values of working memory, such as that in the paper "DADO: A Parallel Processor for Expert Systems" by S. J. Stolfo et al., "Proceedings of the 1984 International Conference on Parallel Processing," pages 74–82.

From the foregoing it can be seen that there are at least two distinctions between digital signal pattern matching and digital data pattern matching. One involves the nature of mathematical operations required: in signal pattern matching, the mathematical correlation requires many floating point multiplication/accumulation sequences to be performed, but in data pattern matching only fixed point additions and subtractions are required. A second distinction involves the size of patterns to be compared; that is, in signal pattern matching a typical pattern is thousands of digital words, but in data pattern matching a typical pattern is perhaps five to ten digital words. Each of the two distinctions involves a multiple-order-of-magnitude difference in numerical requirements making real time digital signal processing more difficult than data signal processing.

Highest processing speed is a significant goal for many designers; and, in the speech recognition arena, an objective of the U.S. Government has been to achieve real-time speech recognition in a 10,000-word speaker-independent system by the early 1990's. See "Strategic Computing New-Generation Computing Technology: A Strategic Plan for its Development and Application to Critical Problems in Defense," Defense Advanced Research Projects Agency, Oct. 28, 1983, page 35. In that plan it is estimated that computational requirements for such a system will be on the order of 20 billion instructions per second (BIPS). Those instructions essentially comprise multiplications and accumulations of multibit binary coded values, which in speech are preferably sixteen bits each for input and 32-bit floating point for subsequent computation.

In the "Sunday Star-Ledger" newspaper published in Newark, NJ, there appeared on Oct. 5, 1986, an article "Princeton 'Brain trust' Top scientists plug into super-computer" by K. MacPherson. That article mentioned a Cyber 250 single computer capable of about 800 million floating point operations per second (MFLOPS). The article also speaks of a planned ETA-10 computer system being manufactured and using up to eight processors, with liquid nitrogen cooling, costing about $10 million which is said to be capable of 10,000 million floating point operations per second (MFLOPS), i.e. a speed about half of the above-noted computational requirement goal-the units of instructions per second and operations per second being different words for the same thing.

Continuing in the multiprocessing direction, an L. Cosell et al. paper "Continuous Speech Recognition on a Butterfly TM Parallel Processor" at pages 717–720 of Proceedings of the 1986 Internatinal Conference on Parallel Processing speaks of, but does not illustrate, multiple processors arranged, with a switch and shared memory, for parallel operation. A maximum array of up to 256 microprocessor nodes is indicated. A specific example on a smaller scale included 15 tightly coupled microprocessor nodes and achieved recognition of a 3.5 second utterance in 11 seconds. The specific microprocessor chip used, at advertised numbers of cycles for multiplication and addition operations and specified minimum cycle time, is capable of about 200,000 such floating point operations per second (FLOPS); so the 256 processors in parallel operation should be capable of about 50 MFLOPS.

In the data pattern matching arena, one of the faster multiprocessing arrays is the binary tree. Such a tree and its capabilities are discussed at length in "The Tree Machine: A Highly Concurrent Computing Environment" by S. A. Browning in Technical Report (Ph.D. Thesis), Computer Science, California Institute of Technology, 1980. The processing element processor is considered at pages 132-134 and is described as including four main parts: a program store, a bank of data storage registers, an arithmetic logic unit (ALU), and some communication handlers. Current work is represented by, for example, the DADO multiprocessing system outlined in the aforementioned S. Stolfo et al. paper. Communication between nodes in Stolfo et al is by way of a three-link path including an input/output (I/O) link extending either up or down in the tree, a so-called handshake line extending both up and down in the tree, and a third link (upward from the node processor and downward from the node data memory). The handshake lines comprise an unbroken wire network extending throughout the tree, but the manner of preventing internode interference through that network is not shown. A DADO 1023-processing-element system was to have an unpipelined microprocessor at each element and was expected to be able to realize a top processing speed of about 570 million such instructions per second (MIPS).

SUMMARY OF THE INVENTION

An improvement in processing speed and capabilities is achieved in a binary tree multiprocessing array of plural, digital, signal processing and communication processing elements, or nodes, and having input/output for the array entirely through a single root node of the tree. Each processing element includes at least a signal processor, i.e. a processor including a hardware, pipelined, multiply/accumulate facility in which both a complete multiply and a complete accumulation operation are completed during each of the smallest periodic clock time intervals of processor operation. The processor cooperates with a processing element memory and a processing element input/output processing facility to perform signal pattern matching of input signal sequences provided to and/or through the root processing element with respect to at least one signal sequence pattern stored in the memory.

A signal processor is to be distinguished from a microprocessor, which typically performs multiplications and accumulations in separate software routines, each involving a sequence of discrete instructions, and which is typically applied to data, vis a vis signal, processing.

BRIEF DESCRIPTION OF THE DRAWINGS

A more complete understanding of the invention and its various features, objects, and advantages may be obtained from a consideration of the following detailed description and the appended claims in connection with the attached drawings in which

DETAILED DESCRIPTION

Figure 1:
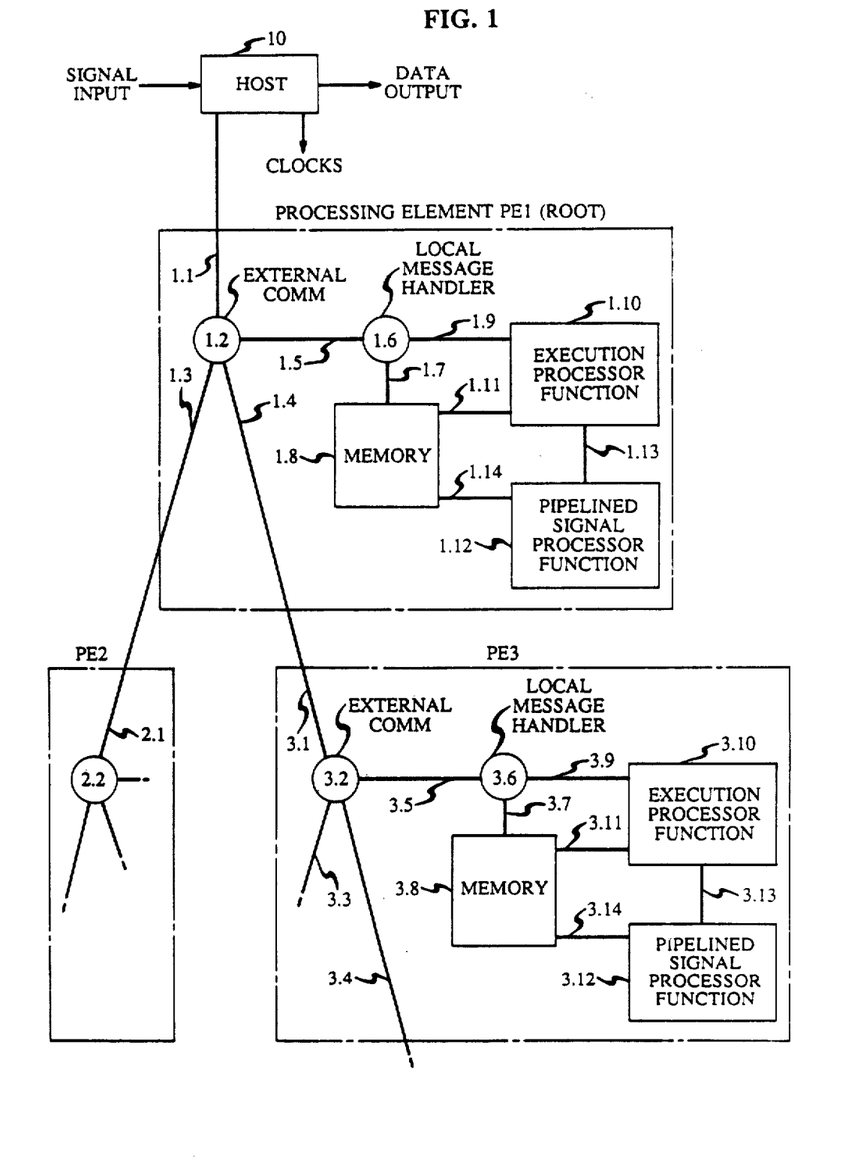
FIG. 1 is a simplified functional diagram of a portion of a binary tree multiprocessing array utilizing the invention.

FIG. 1 depicts a binary tree multiprocessing array in functional diagram form. A host computer 10 receives input signals and provides output data signals for the array in whatever system application makes use of the parallel signal processing function of the array. The host performs the system interface function for the array and is further coupled to processing elements of the array through a root processing element (PE) 1. Clocking signals are provided from the host to the array for keeping the host and array processing elements operating at compatible rates. Circuits for distributing the clocking signals are not specifically shown but advantageously comprise, for example, a clock signal bus between the host and all processing elements and extending through the backplane of equipment frames including plug-in circuit boards containing the actual processing element circuits.

The root PE 1 communicates with two additional PEs 2 and 3 and, through them, with other PEs not specifically shown in FIG. 1 but in rows of expanding size as will be further described in connection with FIG. 4. Each PE, sometimes called a node, is able to communicate with only one PE above it in the conceptual tree array, that one being usually called a parent PE, and with only two PEs below it in the array, those two being usually called children. The top, or root, PE has no other PEs above it and is called the root because all signal input and output for the tree array flows through that PE somewhat analogously to the root of a biological tree-even though in the case of the processing tree the root is usually illustrated at the top as in FIG. 1. In like manner, the PEs of the bottom row, or part of a row, of the tree array which have no child PE are sometimes termed leaf PEs. Between the root and leaf PEs in the array are internal PEs.

Elemental functions of each PE and interconnections between PEs are designated by decimal number reference characters in which digits to the left of the decimal indicate which PE, counting downward by rows and left to right within a row, is under consideration. Digits to the right of the decimal indicate a particular function or circuit element of the array. All nodes are the same so only two are shown in functional detail in FIG. 1 for the purpose of illustrating the manner of communication among PEs. That communication technique will be described subsequently in greater detail and can be characterized as a loosely coupled implementation in which there is command and report communication between two processing functions such that the command asks for completion of certain specified work; and on completion of the work a report is transmitted back to the source of the command, the source being free to do other tasks while awaiting the report.

Each PE includes, with particular reference to PE 1, an external communication processor function 1.2 that handles communication with the host computer 10 (a parent PE in the case of an internal of a leaf PE) by way of a communication line 1.1. That communication line, and other such lines to be hereinafter mentioned between PEs, each is a bidirectional line including an input line part and an output line part. Similarly, the external communication processor function 1.2 communicates with the child PEs 2 and 3 by way of lines 1.3 and 1.4, respectively, and the parent communication lines 2.1 and 3.1 of those two PEs, respectively. Also, a line 1.5 extends from processor function 1.2 to a local message handler processing function 1.6. A line 1.7 extends further to a memory 1.8, and a line 1.9 extends to an execution processor function 1.10. The latter has communication lines 1.11 to the memory 1.8 and 1.13 to a pipelined signal processor function 1.12. The latter function 1.12 further communicates by way of a line 1.14 with the memory 1.8.

Note in FIG. 1 that the external communication function in each PE limits PE direct communication to its parent PE and its up to two children PEs. This prevents the PE communication lines from being one tree-wide bus with the limitations heretofore experienced with the number of processors which can be successfully operated on a common bus for parallel processing.

The term "execution processor" is utilized herein to refer to a non-pipelined microprocessor in contradistinction to a pipelined signal processor. Execution processor functions are limited to arithmetic and logical operation that can be swiftly performed by a non-pipelined microprocessor. Such a limitation arises from the fact that a microprocessor usually includes an arithmetic logic unit that must be microprogrammed to perform multiplications by an appropriate sequence of discrete instructions. Accumulation of resulting products requires a further sequence of discrete instructions. However, so much time is required for each multiply/accumulate sequence that to array enough microprocessors in, e.g., a binary tree to perform real-time mathematical correlations, which involve many rapid multiply-accumulate sequences in a real time application, would require so many processing elements that the power, space, and heat dissipation requirements usually heretofore have been considered to be prohibitive. It has been found that a pipelined digital signal processor function relieves the real-time constraints because it can produce a multiply/accumulate combination operation output in each instruction time. Hence, in FIG. 1 such operations are assigned to the pipelined signal processor function of a PE.

All of the PE functions noted so far are individually well known commercially available functions. Heretofore they have not been interconnected in the manner described herein. In one particular, a pipelined signal processor has not heretofore been employed in a tree processing element. Each of the PE processor functions could be implemented by a separate microprocessor or a digital signal processor. However, it is preferred to employ one set of elements such as are illustratively listed below to implement the host function and the various PE functions:

| Host computer 10 Processor functions 1.2, 1.6, 1.10, and 1.12; and at least a part of memory function 1.8 | AT&T Personal Computer 6300 WE$^{(R)}$ DSP32 Digital Signal Processor cooperating with a communication controller |
|---|---|

An illustrative hardware implementation utilizing the above elements will be hereinafter described in connection with FIGS. 2 and 3 before describing the manner of cooperation among PEs of the illustrated tree. That illustrative implementation is for signal pattern matching and involves mathematical correlation computations in which time for communication among PEs is a relatively small proportion of total processing time of the tree. Consequently, the processing speed of the pipelined processor function of the individual PE and the number of PEs in the tree essentially determine the overall time required to perform any particular pattern matching operation by the parallel processing operation of the tree.

Figure 2:
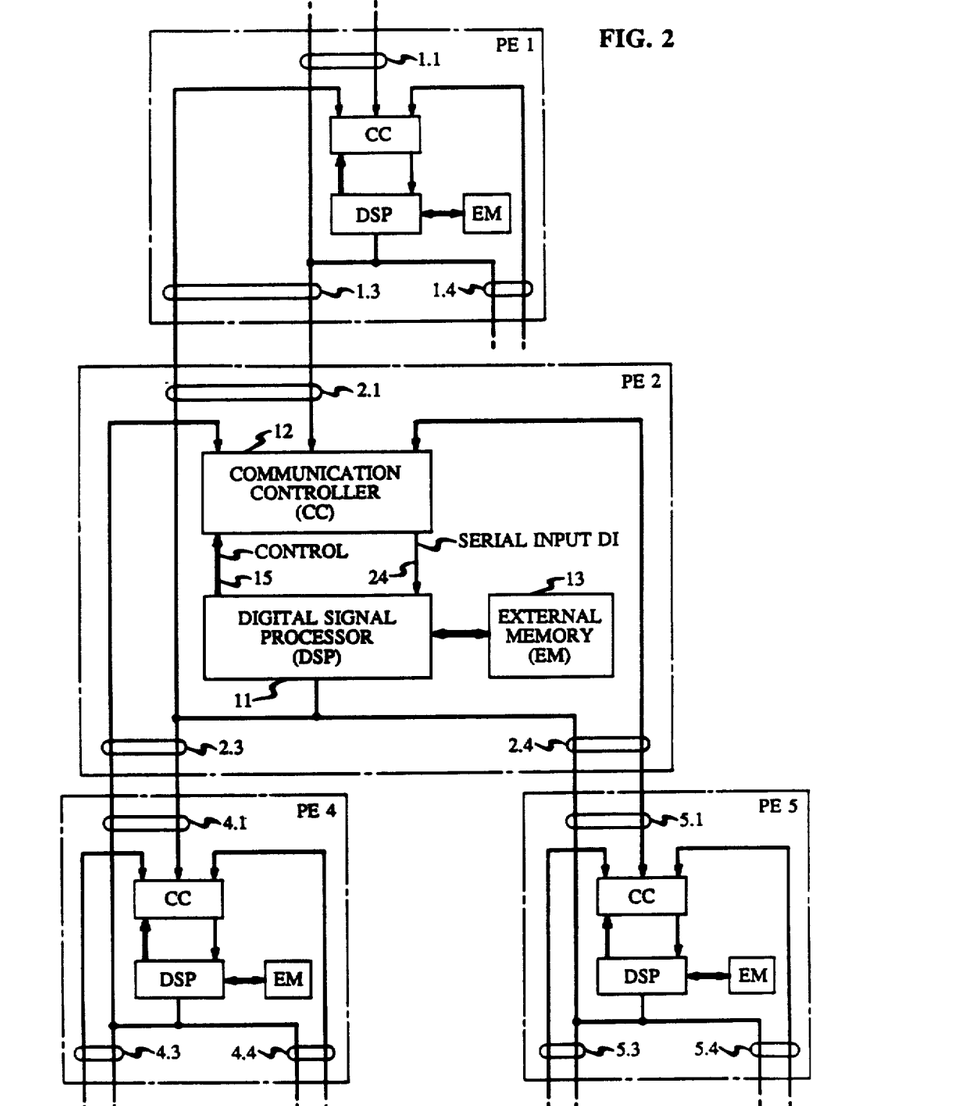
FIG. 2 is a simplified block and line diagram of several processing element nodes interconnected in a manner useful in the tree of FIG. 1.

In FIG. 2 there is shown a block and line diagram of several PEs implemented using the foregoing elements. Diagram elements which are the same as those of FIG. 1 are indicated by the same reference characters. PE 2 is shown as an internal PE with full input/output (I/O) connections in the form of buses for the respective communication lines 2.1, 2.3, and 2.4. The parent PE 1 is shown with only its I/O connection buses for communication line 1.3 with PE 2. The child PEs 4 and 5 are shown with only their I/O connections buses for communication lines 4.1 and 5.1, respectively, with PE2.

Each PE illustratively includes a digital signal processor 11 of the type mentioned above connected to cooperate with programmable array logic (PAL) 12 such as, e.g. the Cypress Semiconductor Corp. reprogrammable CMOS device C 22V10 programmed for operation as a communication controller. External memory 13, i.e., external with respect to the processor 11, is also shown coupled to the digital signal processor 11, but may not be required in some applications. PE input and output connection reference characters are cast in the same format as already described in connection with FIG. 1, and where elements of the two figures are the same, the same reference characters are employed.

Communication controller (CC) 12 performs a multiplexing function implemented, in the specific device mentioned, by an interconnection matrix associated with so-called macrocells as shown in greater detail in the manufacturer-provided data sheets. The matrix is a programmable AND gate array that is responsive to clock signals provided to all PEs from the host 10 (via circuits not shown) and responsive to control signals on circuits collectively indicated as a bus 15 from the processor 11 as that processor executes its program. Those signals determine when signals at one of the three CC 12 inputs at a time will be coupled through the CC 12 to a serial input bus 24 of the processor 11. The control signals may be applied through other ones of the device signal inipiuts or through one of its signal outputs which can be individually configured as an input as described in the manufacturer's data sheets.

Figure 3:
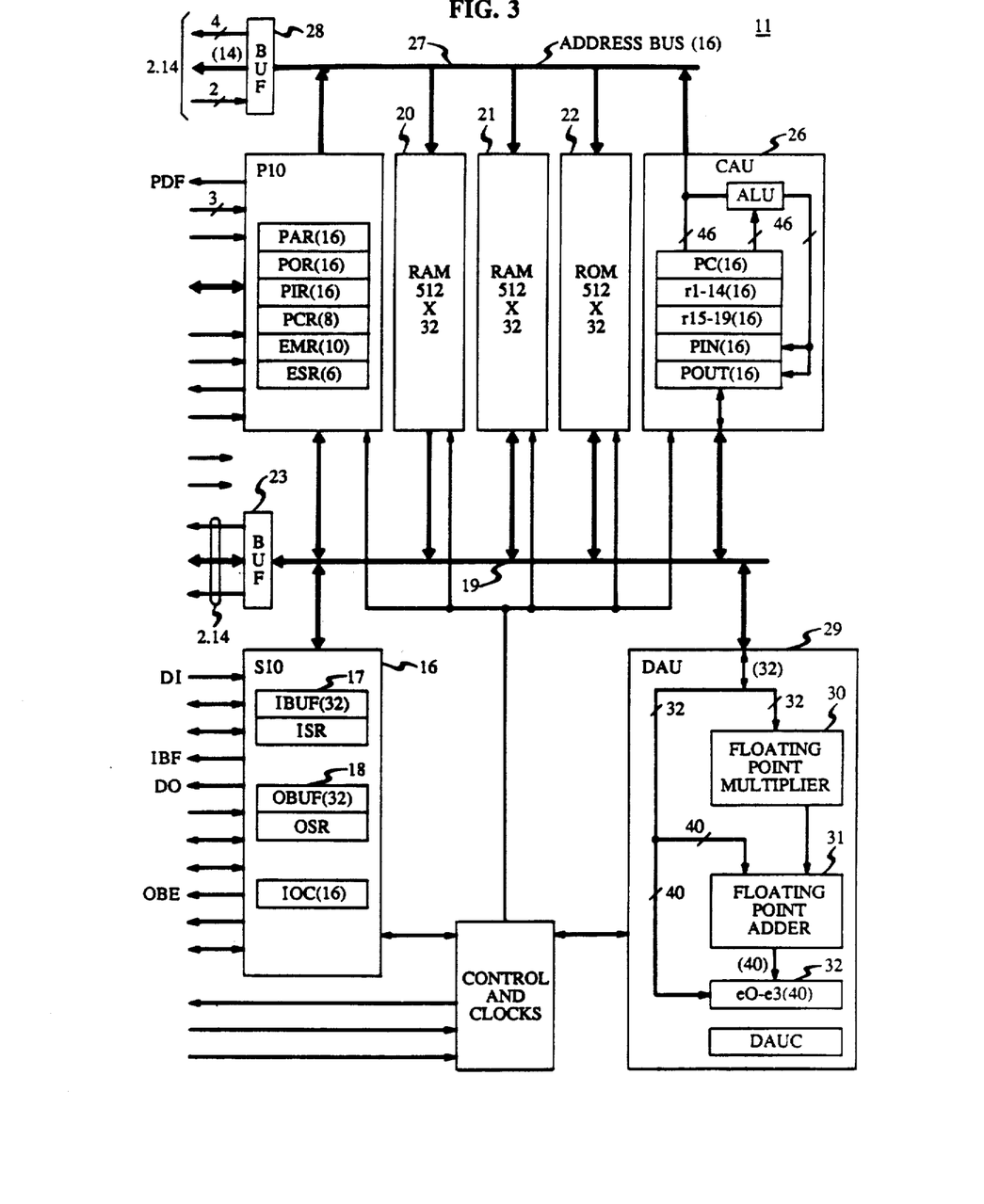
FIG. 3 is a block and line diagram of the architecture of one commercial digital signal processor suitable for use in processing element nodes of FIG. 1.

The digital signal processor 11 is shown in greater illustrative detail in FIG. 3, which is a simplification of a block diagram of the processor as depicted in the Information Manual provided by the manufacturer for processor users. Outlined here is the manner in which the FIG. 3 diagram corresponds to the diagrams of FIGS. 1 and 2. For convenience of description, the PE 2 in FIG. 2 is used as a basis for illustration. Different parts of the processor perform all or part of the respective PE functions already noted in connection with FIG. 1.

A serial I/O unit, SIO unit 16 in the processor, together with processor software (which resides in processor memory to be identified) and the CC 12 and its firmware, perform the external communication processor function 2.2. The SIO unit 16 input buffer IBUF 17 receives inputs (on device pin DI) from any one of the input line parts of lines 2.1, 2.3, and 2.4 of the PE 2 as selected by the CC 12; and the output buffer OBUF 18 provides outputs (on device pin DO) all of the output line parts in parallel of those same lines. Additional circuit detail of the SIO unit 16 can be found in the Information Manual. A parallel I/O unit, PIO, detail of which is also found in the Information Manual, is also included in the illustrative processor and provides a PDF control signal to the CC 12. Otherwise the PIO is employed only for initializing and maintaining the processing element in the tree array.

Processor 11 program and Data Bus 19 perform the local message handling processor function 2.6. The Data Bus extension to the SIO unit 16 is the communication line 2.5; the BUS 19 extensions to the processor 11 random access memory RAM blocks 20-22 (and via the Data Bus 19 buffer BUF 23 to any external memory 13) are the communication line 2.7; and the Bus extension to the Control Arithmetic Unit CAU 26 is the communication line 2.9.

Processor 11 CAU 26 performs the execution processor function 2.10. The connected Address Bus 27 and Data Bus 19 connections to RAM blocks 20 and 21 and ROM block 22 (and to external memory by way of the Address Bus 27 buffer 28) are the communication line 2.11, and the Data Bus 19 connections are the communication line 2.13 to the processor 11 Data Arithmetic Unit DAU 29.

Finally, the DAU 29 performs the pipelined signal processor function 2.12. The Data Bus 19 connections between DAU 29 and the RAM blocks 20 and 21, ROM block 22, (and to any external memory by way of the Data Bus buffer 23) are the communication line 2.14. The included floating point multiplier 30 and floating point adder 31 are pipelined as shown so that, in a single multiply/accumulate instruction execution, two values are multiplied, the product added to a third value, and the sum stored in an accumulator 32 thereby performing two floating point operations (MFLOPS) in execution of a single instruction.

Returning briefly to FIG. 2, the processor serial output bus, pin DO in FIG. 3, is the path by which processor signal output is applied in parallel to inputs of the child PEs 4 and 5 and to the parent PE 1. Each PE selects whether it will listen to its parent PE or one or the other of its child PEs by control signals sent to its own CC 12. It is apparent that other output coupling schemes could be employed such as, for example, employing another communication controller responsive to the digital signal processor single serial output and to processor SIO and PIO control signals to couple that single output selectively to any one at a time of the parent or child PEs.

Figure 4:
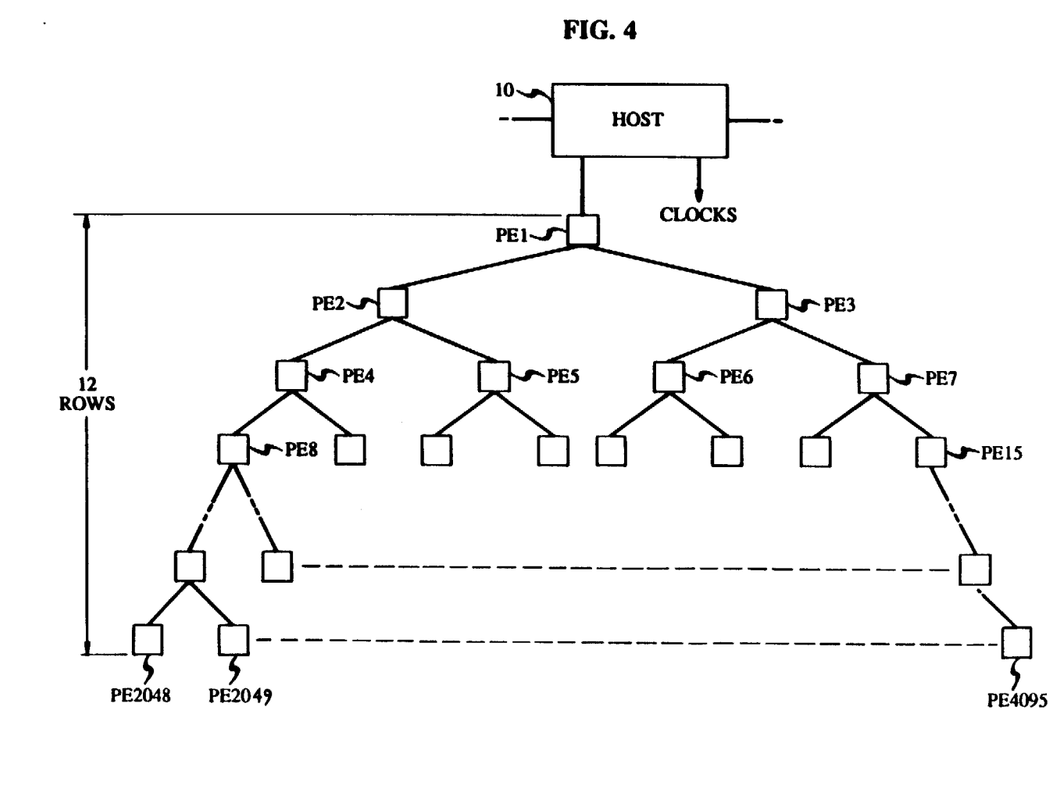
FIG. 4 is a partial binary tree diagram illustrating one application of a binary tree utilizing the invention for high speed patten matching.

FIG. 4 illustrates a tree of 4095 PEs and including twelve full rows of expanding size. Those 4095 PEs, when implemented utilizing a pipelined multiply/accumulate processor such as the digital signal processor data arithmetic unit and associated processor circuits of FIG. 3, each DAU with an 8 MFLOPS processing capacity, are more than sufficient to realize the computing capability goal of the DARPA document previously cited. Clearly, the exact number of PEs is not critical; and additional rows if necessary could provide still further computing capacity. It will be shown that communication time for messages to ripple up or down in the tree in the asynchronous manner to be described is such a small part of the total processing time for signal pattern matching that it can be neglected for most purposes. Furthermore, since all PEs are identical, it is relatively simple to make a tree of any desired size. In addition, it is convenient to fabricate multiple PEs on a single rectangular plug-in circuit board. For example eight PEs have been readily constructed on a plug-in 8-inch by 13-inch circuit board. Thus, 16 PEs could be constructed readily on a standard 16-inch by 13-inch circuit board. Multiple such boards can be interconnected and incorporated into a tree as discussed in greater detail, e.g., at pages 118-120 in the doctoral dissertation "Area-Efficient VLSI Computation" by C. E. Leiserson, The MIT Press, 1982, 256 such plug-in circuit boards of about 16-inch by 13-inch size readily accommodate the full 4095-PE tree of FIG. 4; and those boards can be installed in about sixteen conventional equipment racks, an arrangement for which powering, temperature control, and installation are within the capabilities of the present state of the art.

With primary reference to the process flow diagrams of FIGS. 5-10, attention is directed now to the manner of communication within the parallel processing tree illustrated in FIG. 1. The communication and processing architecture supports a set of parallel constructs.

The major parallel construct is a sliced procedure in which identical programs are executed simultaneously in each PE on different data sets. The multiple executions of this single program can follow different instruction streams, still within the single program, of course, depending upon the data. These potentially different instruction streams are forced to converge and synchronize upon the completion of the sliced procedure. This program execution concept can be described as representing a Single Program Multiple Data (SPMD) machine. In support of the sliced procedures, that are several global communication instructions, described below, that are invoked from the host 10.

By way of background, the concept of using a binary tree machine for parallel matching and the associated broadcast, and resolve types of functions, were taught in a technical report "A Tree Machine for Searching Problems" by J. L. Bentley and H. T. Kung, Department of Computer Science, Carnegie-Mellon University, Pittsburgh, Pa., Aug. 30, 1979. These functions were implemented in the DADO tree machine mentioned, but not explained, by Stolfo et al. in their aforementioned 1984 paper. A BROADCAST instruction transmits data from the host to all PEs. Such data may comprise, for example, reference data templates against which input data sequences are to be compared, instructions to cause certain programs to be executed (positively or conditionally) in each PE receiving the instruction, and input data signal sequences to be compared against previously stored reference data. A RESOLVE instruction causes the tree to select, e.g., the minimum of a set of values, such as the results of a sliced procedure that reside in respective different PEs. A REPORT instruction typically follows a RESOLVE instruction and sends to the host a selected value from the PE that contained the minimum value.

A typical instruction sequence for signal pattern matching involves the BROADCAST, SLICED PROCEDURES, RESOLVE, and REPORT instructions and provides opportunity, in the SLICED PROCEDURE instruction execution, to utilize the digital signal processor 11 pipelined multiply/accumulate function (in DAU 29) that makes enhanced operating speed possible. K reference patterns are distributed among N PEs of a tree where usually $K \geq N$. An unknown digital signal pattern is broadcast from the root of the tree to all N PEs in a time proportional to $\log_2 N$ (the depth of the tree). Each PE concurrently computes, via a sliced procedure, the correlation scores between the unknown and its reference patterns. The best score is bubbled up to the root in a time again proportional to $\log_2 N$. The computation time is thus accelerated linearly by a factor of N at a small communication cost proportional to $\log_2 N$.

Figure 5:
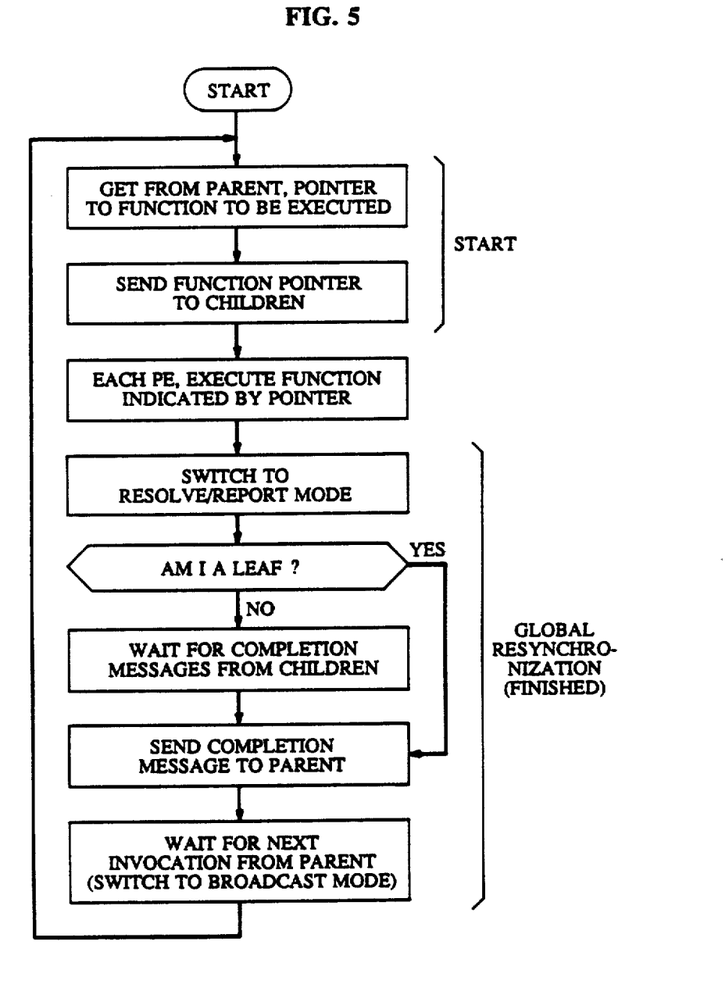
FIGS. 5–9 are process flow diagrams illustrating operation of the tree of FIG. 1 for parallel signal processing.

Each PE generally operates in the manner indicated in the FIG. 5 control loop process. That is, the tree is powered up to start operations; and the host processor 10 initiates some function, e.g., one of the RESOLVE or REPORT instructions mentioned above, by broadcasting a pointer to each PE. The pointer is initially stored in the root PE SIO input buffer IBUF 17. As the pointer is received in each PE of the tree, it is sent on to any child PEs before locally beginning execution of the function indicated by the pointer. As will be indicated below, plural get/send step sequences may be carried out before the execution step takes place. Serial illustrative function execution processes are illustrated in FIGS. 6-9. Upon completion of execution in each PE, a global resynchronization routine can follow during which each PE, having completed its asynchronous execution of the previously directed function, awaits new direction from its parent. After resynchronization, the control process loops back to look in the SIO input buffer IBUF 17 for any further pointers.

In resynchronization, each PE first switches to RESOLVE/REPORT mode, and then checks whether or not it is a leaf PE, e.g. by checking a PE-leaf flag in RAM. If it is a leaf, a completion message is sent to its parent. If it is not a leaf PE, it awaits completion messages from its child PEs and then sends its own completion message to its parent. After sending its completion message, it awaits the next invocation of an operation by its parent PE by switching to the BROADCAST mode.

The digital signal processor 11 signals to the CC 12 for the above control loop operation are, data input and output being by way of pins DI and DO, respectively:
Outputs-OBE-output buffer empty
IBF-input buffer full
PDF-state bit from the parallel I/O unit PIO
0-BROADCAST MODE (read from parent)
1-RESOLVE/REPORT mode (read from children).

CC 12 responds to those signals in the following manner. If in the BROADCAST mode, the CC 12 selects the parent input to be routed to serial input DI of the DSP 11. If in the RESOLVE/REPORT mode, CC12 alternatively selects the left childs or right child input to be routed to input DI. In DSP 11 the input goes to input shift register (ISR) and then to input buffer (IBUF).

Figure 6:
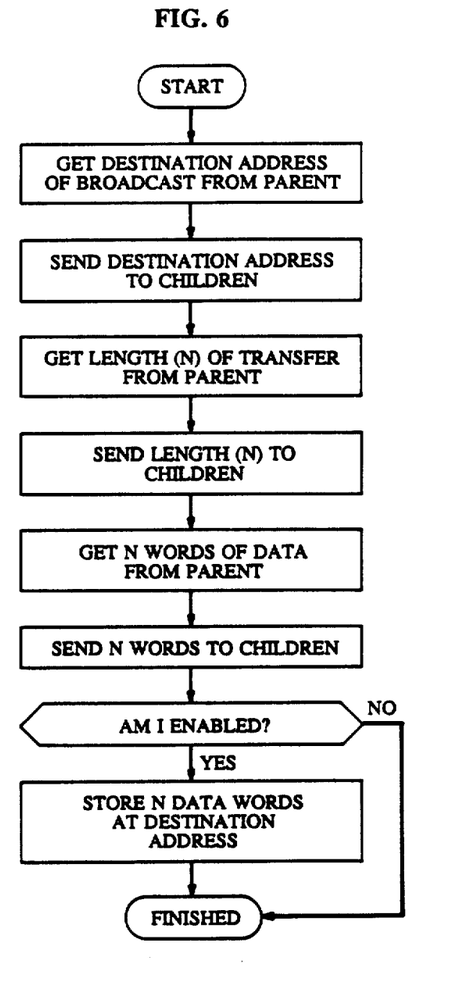

In the FIG. 6 BROADCAST procedure, a block of data is transferred from the host processor 10 to all, or to a subset, of the tree PEs. It is also used to load programs, which can be treated as data, into the processing elements. This procedure sends a message B along line 1.1 in FIG. 1 to the external communications function 1.2. That message comprises the following four field components that are not necessarily of equal size and that are illustratively distributed in four sequential steps as indicated in FIG. 6:

| B.1 | provides a pointer to the local program for the BROADCAST function. |
| B.2 | indicates the address in the PE memory at which the data should be stored. |
| B.3 | indicates the size of the block of data being broadcast |
| B.4 | is the actual data being broadcast, and this field will usually span many bytes. |

The B.1 field starts the BROADCAST procedure, and the other fields are processed in three Get/Send step combinations of the type indicated in FIG. 5 before the enablement test and local storage execution steps are performed. Following that execution, the BROADCAST routine is finished and the global resynchronization takes place as described in regard to FIG. 5. The BROADCAST procedure is reviewed below in regard to the FIG. 1 functions.

External communication processing function 1.2 repeats the message B onto its left child and right chld communication lines 1.3 and 1.4 at the same time for extension by way of lines 2.1 and 3.1 to the respective PEs 2 and 3 which similarly repeat the message to their child PEs, if any. The message is thus relayed step by step from the root PE 1 to all leaf PEs and all internal PEs. In any PE, after its external communication processing function, e.g. 1.2, has completed its message relay operation to the children, execution is begun by relaying the message to the local message handling processing function 1.6 which switches the data field B.4 to the local memory 1.8, along line 1.7, where it is stored at the starting address indicated in field B.3. On completion of the storing function, the handling function 1.6 sends a task completion message to the external communications function 1.2 along line 1.5.

In regard to resynchronization, each PE external communication handling function collects completion messages from all of its child PEs and its local message handling function and then sends its own completion message to its parent PE (i.e. the host in the case of the root PE 1). After completion messages have thus rippled up through the tree to the host, the latter is free to initiate another operation.

One such operation is a sliced procedure, i.e. one that is executed simultaneously in each PE. The description which follows, is associated with the flow diagram of FIG. 7. Prior to execution, identical copies of this single procedure are stored in the local memory (RAM) in FIG. 3 of each PE by a BROADCAST procedure. Data on which the procedure operates is similarly stored but illustratively is different among the PEs, e.g., different reference digital signal sequences representing, for example, the various speech templates for a speech recognition vocabulary. The paradigm is thus that of a Single Program Multiple Data (SPMD) machine. Although the local program is the same in each PE, their instruction streams vary as a function of respective local data sets.

Host computer 10 initiates a sliced procedure by broadcasting a message SLP, in the form of a pointer, to the tree by way of root PE 1. That message includes one field component, again broadcast in a get/send step pair before execution can begin:

| SLP.1 | provides a pointer to the starting memory address of the sliced procedure program (which is identical in all PEs). |

As already described, the message ripples through the tree. In each PE the external communications handler function receives the message and relays it first to its child PEs, if any, and then to its local message handler function. That function, i.e. the FIG. 4 Data Bus and the signal processor software residing in the Control and Clocks circuit, recognize the message SLP and send a further message to execution processor function 1.1 (in root PE 1) to start execution of the sliced procedure program previously stored in the memory function 1.8 at the starting address that had been specified in field SLP.1. The program directs which of the execution processor function 1.10 and the pipelined processor function 1.12 shall execute any particular instruction.

Figure 7:
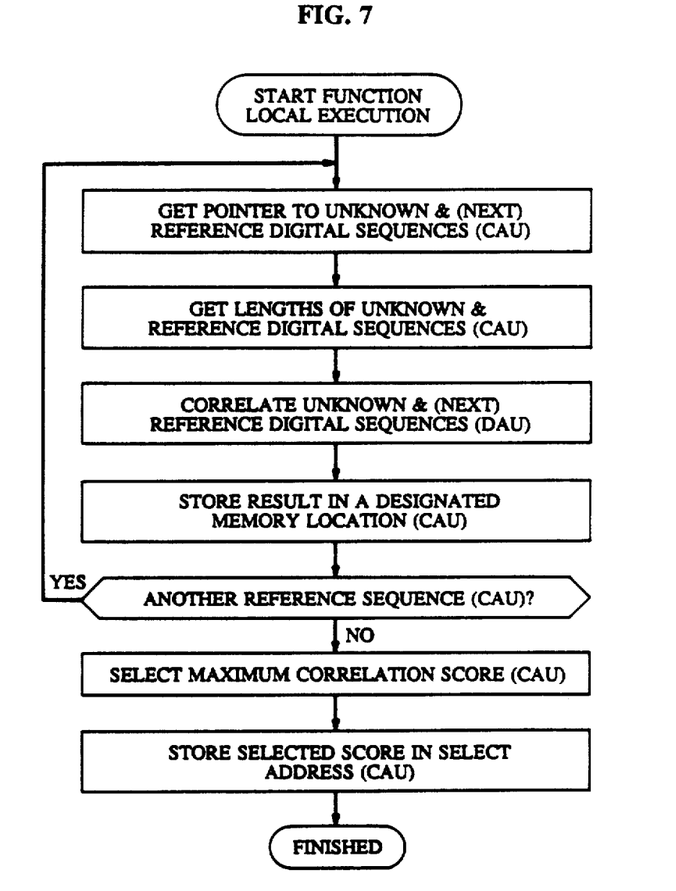

For example, the program may require the pipelined processor function to correlate mathematically the values of an input signal string with corresponding values of each of several stored reference signal strings to determine and store the computed correlation. The mathematical correlation involves the digital-number-by-digital-number multiplication of each number of one digital pattern sequence by the corresponding number of another digital pattern sequence and accumulation of the resulting products. Such a process is shown in FIG. 7 where steps performed by the CAU and DAU are separately designated. The CAU obtains from PE memory and supplies to the DAU the digital sequences identified in pointer and length information. With those sequences, the DAU computes the mathematical correlation and returns results to the CAU for storage. When the unknown thus has been correlated with each reference, the CAU selects the maximum score and stores it in a predetermined address for use in a subsequent RESOLVE operation. The sliced procedure is then finished, and the global resynchronization routine is entered. It has been found that in a correlation process for, e.g., recognition of plural spoken words at least 90 percent of the process time is taken up by correlations in the DAU.

Figure 8:
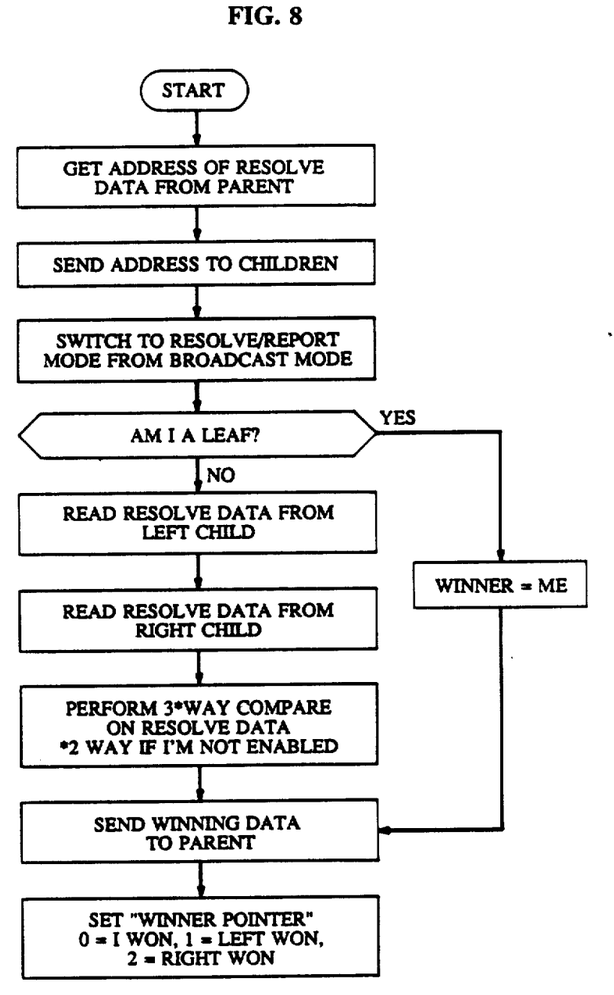

A RESOLVE procedure, illustrated in FIG. 8 for one PE, distinguishes the PE with stored data having a certain value relationship to corresponding data in certain other (typically all other) PEs of the tree. In a typical application, the relationship is that of a maximum value of some variable, such as the maximum correlation between unknown and reference digital signal sequences, identified in the example just outlined in regard to the sliced procedure description.

The host 10 broadcasts a message RES to the tree via the root PE 1 and including two component fields, transmitted in separate get/send step pairs, to start the RESOLVE procedure:

| RES.1 | provides pointer to the local code that achieves the RESOLVE function. |
| RES.2 | indicates the location in memory function 1.8 (identical location in each PE) be resolved upon, e.g., the location where the PEs had proviously been directed to store their correlation scores. |

In each PE the RESOLVE instruction is relayed to any child PEs and then to the local message handling function for storage as previously described for other BROADCAST operations. Then the external communication processor function switches the PE mode of operation to the Resolve/Report mode from the BROADCAST mode and begins the RESOLVE phase of the operation.

A PE checks whether or not it is a leaf PE. A leaf PE of the tree moves its correlation score from the RAM location designated by RES.2 to its output buffer OBUF to be available for reading by its parent PE. Each higher internal PE in the tree controls its CC 12 to read data first from the left child and then from the right child into the local digital signal processor RAM at program specified locations. The execution processor function, including CAU, compares the three correlation values, and selects the maximum.

Any particular PE can be enabled or disabled for future operations under program control, i.e., by a sliced procedure in which the result is the setting of an ENABLED/DISABLED flag. If the flag is in the DISABLED state, the PE external communication function can relay messages to, and read data from its child PEs, if any, but not as to its own local message handler processing function. If the flag is in the ENABLED state, the PE external communication function can also exchange message and data with its local message handler function.

The winning maximum correlation information is moved into the PE output buffer OBUF to be read by the parent PE. Finally a two-bit pointer is stored in RAM to indicate the communication line, i.e. line from one of the child PEs or from its own memory function 1.8, over which that maximum correlation value had been received. For example, a pointer value of zero indicates that the local PE won, one that the left child won, and two that the right child won. The pointer set provides the process guideposts for later calling upon that PE so distinguished to identify and report its corresponding reference signal train. RESOLVE is now finished and the resynchronization routine is entered.

Figure 9:
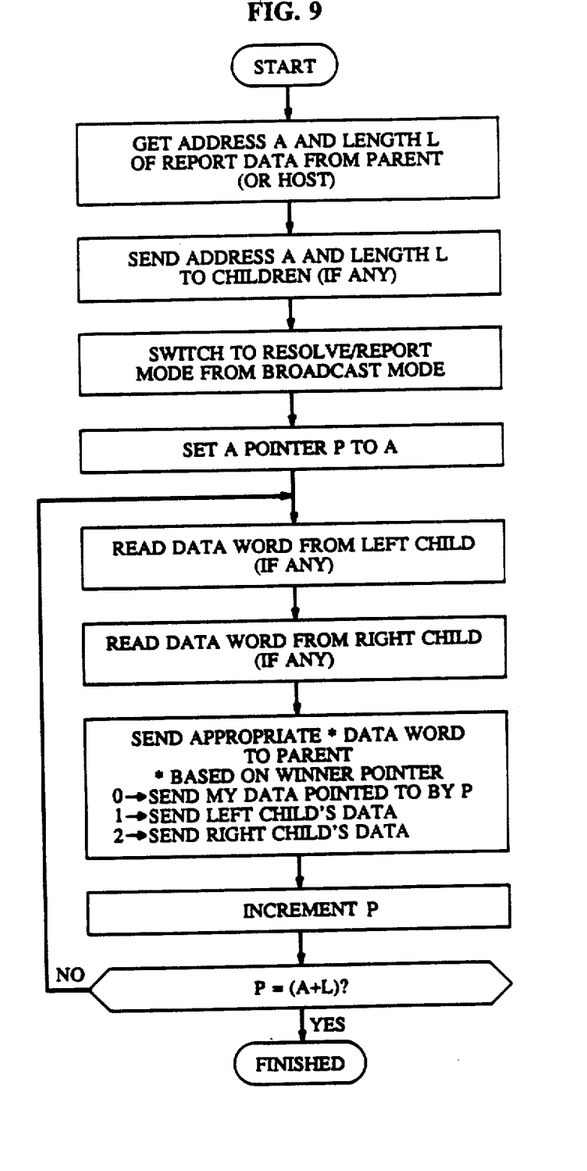

FIG. 9 depicts a REPORT instruction process which usually follows a RESOLVE instruction and which causes the transmission of data from a previously distinguished PE to the host 10. To that end the host 10 sends to the tree via the root PE 1 a message REP comprising three component fields sent in three successive get/send step pairs:

| REP.1 | provides a pointer to the starting address of the local REPORT instructions |
| REP.2 | indicates the starting address A in the PE memory from which report data is to be transmitted |
| REP.3 | indicates the amount of data (length L) to be transmitted. |

Broadcast of a REPORT message REP causes each PE to relay the address and word-length information to its children and switch to the RESOLVE/REPORT mode. Next, a pointer P is set to the address A; and the PE actuates its CC 12 to read from its children in sequence the data words at address A. The PE then picks the one indicated by the pointer, and sends it to its output buffer to be read by its parent PE. The pointer P is incremented and another digital word read from the children, screened in accordance with the winner pointer, and the selected one set in the output buffer to be read by the parent PE. When the total length L of signal sequence has been thus transmitted, the REPORT process is at an end for the PE and it enters the global resynchronization routine.

That reported readout data, e.g., a label for the reference digital signal sequence that had previously been identified as having the maximum correlation with respect to an input digital signal sequence, is transmitted to the host 10 via the PEs. The host then uses the label rippled up in the manner just described as its identification of the original input signal which is also the DATA OUTPUT in FIG. 1.

A tree array of about 4095 pipeline-equipped PEs as hereinbefore described would be advantageously operated to match binary coded digital pattern sequences as follows. Input pattern sequences arriving at 1000 16-bit words/sec would be mathematically correlated against 20,000 reference patterns, each reference pattern being represented by 500 data words and being stored 5 reference patterns or less per PE. The correlation of each individual reference pattern against the input requires at least a processing rate of 1 Million FLOPS. A DSP32 processor, for example, is capable of 8 MFLOPS, and thus can correlate the input against 5 references in realtime, conservatively assuming 70% utilization of the DAU. Thus, 4095 PEs can correlate 20,000 reference patterns against the input signal at a processing rate of at least 20 Billion FLOPS.

The communications overhead to broadcast the input pattern sequences to the PEs is a small percentage of the processing. The illustrative implementation of the tree-machine described herein can broadcast data at approximately 1 byte per tree-level per microsecond. This example requires broadcasting 2000 bytes per second in a 12-layer tree. Since the broadcast is pipelined, it requires 12 microseconds for the first bit to reach the leaves, but subsequent bits arrive at 8 bits (1 byte) each microsecond. Thus, the broadcast time is 2012 microseconds, or approximately 2 milliseconds out of a time interval of 1 second. Thus, communication requires approximately 0.2% of the processing time.

Although the invention has been described in connection with a particular embodiment thereof, it is to be understood that additional embodiments, modifications, and applications thereof which will be obvious to those skilled in the art are included within the spirit and scope of the invention.

What is claimed is:

1. A binary tree multiprocessing machine comprising:
   an array of plural identical signal processing and communicating elements connected to a host through a root element,
   said elements arranged in a sequence of tree levels extending between said root element, through at least one multiple element intermediate level, to a multiple element leaf level,
   said elements comprising means for matching unknown digital signal pattern data to reference digital signal pattern data by executing a process substantially identically performed in each element and consisting of Broadcast, Sliced Procedure, Resolve, and Report functions,
   means acting through said root element, for effecting input/output communication and data signal coupling for the entire array,
   each element comprising:
      an input/output processing facility and a memory for storing said reference digital signal pattern, and
      a hardware, pipelined multiply/accumulate processor and an execution processor in each said element,
   means for selectively coupling command signals from said Host received through said input/output processing facility during said Sliced Procedure function, to said pipelined processor and to said execution processor, for mathematically correlating unknown input digital signal pattern data with said reference digital signal pattern data stored in each said element,
   said pipelined processor executing floating point multiplication and floating point addition operations in a single multiply/accumulate instruction execution, on said unknown data and said reference data thereby performing two floating point operations in execution of a single instruction.

2. The binary tree multiprocessing array in accordance with claim 1, further comprising:
   means for interconnecting each of said elements in one of said levels for bidirectionally communicating with only one of said elements, a parent element, in an adjacent level in the direction of said root element, and for bidirectionally communicating with no more than two of said elements, child elements, in an adjacent level in the direction of said leaf level.

* * * * *